J. MELVILLE.
RESILIENT HUB.
APPLICATION FILED JULY 29, 1913.

1,085,352.

Patented Jan. 27, 1914.

Inventor
JOHN MELVILLE

Witnesses
Robert M. Sutphen
A. J. Hird

By Watson E. Coleman
Attorney

UNITED STATES PATENT OFFICE.

JOHN MELVILLE, OF QUARTZ, CALIFORNIA.

RESILIENT HUB.

1,085,352.  Specification of Letters Patent.  Patented Jan. 27, 1914.

Application filed July 29, 1913. Serial No. 781,890.

*To all whom it may concern:*

Be it known that I, JOHN MELVILLE, a citizen of the United States, residing at Quartz, in the county of Tuolumne and State of California, have invented certain new and useful Improvements in Resilient Hubs, of which the following is a specification, reference being had to the accompanying drawings.

This invention relates to new and useful improvements in resilient hubs and more particularly to a resilient hub which is especially adapted for application to automobiles and vehicles of the like character, the object of the invention being to provide a resilient hub which will absorb the shock and jar, caused by passing over rough and uneven roads, which is usually conveyed to the body of the vehicle.

Another object of the invention is the provision of a resilient hub of the above character which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claims and shown in the accompanying drawings, in which—

Figure 1:
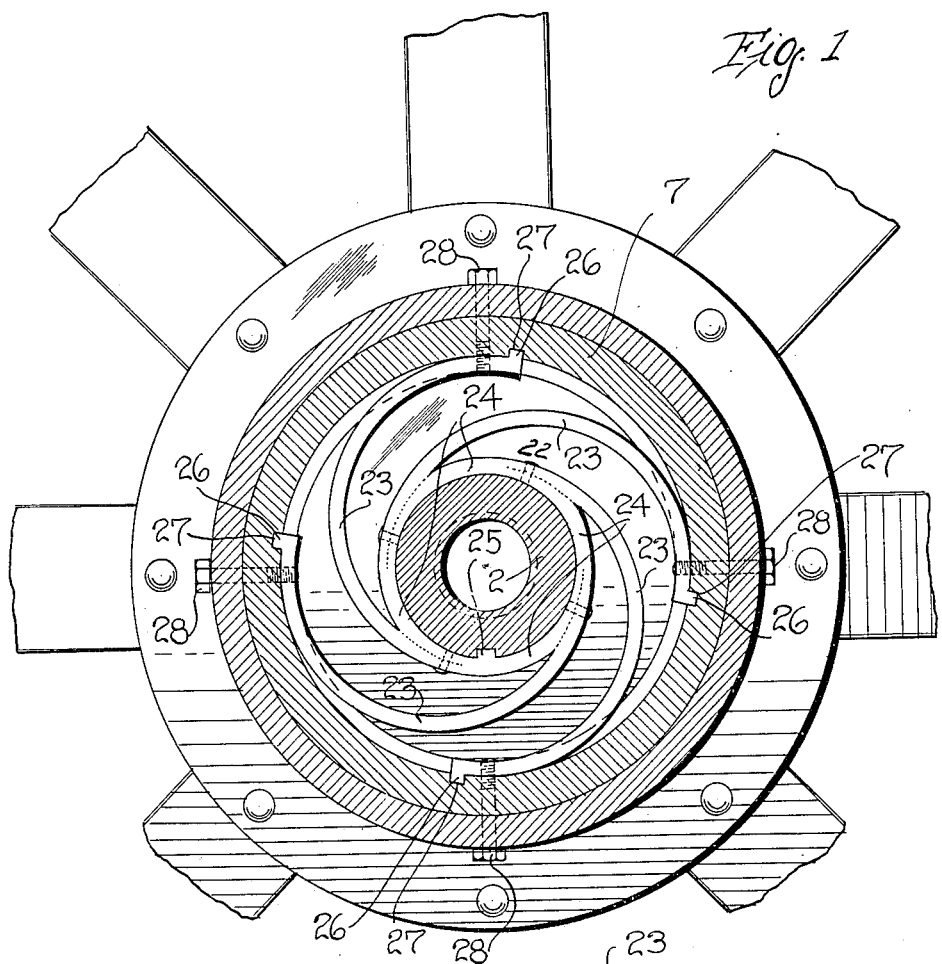
Figure 2:
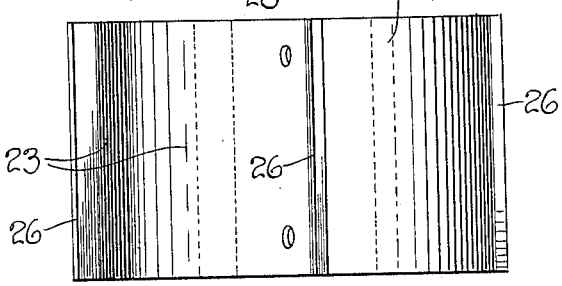

Figure 1 is a transverse sectional view of a resilient hub of a vehicle wheel constructed in accordance with my invention; Fig. 2 is a plan view of the spring structure illustrated in Fig. 1.

In the accompanying drawings, I have illustrated a vehicle hub constructed in accordance with my invention which comprises a plurality of leaf springs as shown at 23, the inner ends of which are welded together to form a continuous ring 24 adapted to be slidably mounted upon the hub casing 2. The ring 24 is provided upon its inner face with a transverse rib 25 which is adapted to be inserted within the groove 22 formed in the periphery of the casing 2 when the springs are inserted within the hub. The outer end of each one of the springs 23 is provided with an out-turned rib 26 adapted to be inserted within the grooves 27 formed in the inner face of the hub member 7. The outer ends of the springs 23 are securely held in position by means of the screw bolts 28 inserted through the outer hub member 7 and engaged with the ends of the springs.

From the above taken in connection with the accompanying drawings, it will be readily apparent that I have provided a simple and durable hub which may be readily taken apart and put together and which at the same time will absorb all shock and jar caused by driving over rough and uneven roads. It will also be apparent that my improved spring hub is particularly adapted for use upon automobiles or other vehicles provided with the solid tire type of wheels.

It will be readily seen that my device is extremely simple in its construction, durable in use and can be manufactured at comparatively low cost.

While I have shown and described the preferred form of my invention, it will be obvious that various changes in the details of construction and in the proportions may be resorted to for successfully carrying my invention into practice, without sacrificing any of the novel features or departing from the scope of the appended claims.

What I claim is:—

1. A device of the class described including an axle casing, a plurality of leaf springs welded together at one end to form a ring, means for securing said ring to the axle casing, a hub member arranged in spaced relation with the axle casing and means for securing the ends of the springs to the hub member.

2. A device of the class described including an axle casing, having a transverse groove therein, a plurality of leaf springs having their inner ends welded together to form a ring, a rib formed upon the inner face of said ring and adapted to engage within the groove in the axle casing, a hub member arranged in spaced relation with the axle casing, having a plurality of transverse grooves upon the inner face thereof, ribs formed upon the outer ends of said leaf springs and adapted to be arranged within said grooves and means for retaining the ends of said springs in position.

In testimony whereof I hereunto affix my signature in the presence of two witnesses.

JOHN MELVILLE.

Witnesses:
F. M. GARRISON,
CATHARINE I. GARRISON.

Copies of this patent may be obtained for five cents each, by addressing the "Commissioner of Patents, Washington, D. C."